United States Patent [19]

Oace

[11] Patent Number: 4,547,208
[45] Date of Patent: Oct. 15, 1985

[54] FLUID PROPELLING AND FILTERING APPARATUS WITH REMOVABLE FILTER CARTRIDGE

[75] Inventor: Jon R. Oace, Portland, Oreg.

[73] Assignee: Research Industries, Inc., Portland, Oreg.

[21] Appl. No.: 489,112

[22] Filed: Apr. 27, 1983

[51] Int. Cl.⁴ .............................................. B01D 45/00
[52] U.S. Cl. .................................... 55/400; 55/473; 55/484; 55/498; 415/121 G; 210/493.5
[58] Field of Search ............... 55/316, 351, 400, 473, 55/498, 484, 510; 210/493.5; 415/121 G

[56] References Cited

U.S. PATENT DOCUMENTS

| 107,665 | 9/1870 | Colwell | 55/400 |
|---|---|---|---|
| 838,602 | 12/1906 | Zellweger | 55/467 |
| 2,848,065 | 8/1958 | Sebok | |
| 3,018,896 | 1/1962 | Gewiss | 55/400 |
| 3,190,544 | 6/1965 | McDonald | 55/400 |
| 3,209,520 | 10/1965 | McKinlay | |
| 3,217,470 | 11/1965 | Omohundro | |
| 3,286,445 | 11/1966 | Welch | 55/467 |
| 3,386,230 | 6/1968 | Riesberg et al. | 55/498 |
| 3,392,846 | 7/1968 | Getzin | |
| 3,408,438 | 10/1968 | Staunton | |
| 3,498,032 | 3/1970 | Scott | 55/473 |
| 3,523,409 | 8/1970 | Paterson | 55/471 |
| 3,617,149 | 11/1971 | Gibson | |
| 3,676,985 | 7/1972 | Foreman et al. | |
| 3,712,033 | 1/1973 | Gronholz | |
| 3,803,817 | 4/1974 | Lewis | |
| 3,807,150 | 4/1974 | Maracle | 55/498 |
| 3,861,894 | 1/1975 | Marsh | 55/316 |
| 3,925,043 | 12/1975 | Matrone et al. | |
| 4,038,058 | 7/1977 | Miskiewicz | |
| 4,234,326 | 11/1980 | Bailey et al. | 55/387 |
| 4,289,510 | 9/1981 | Herndon, Jr. | |
| 4,411,675 | 10/1983 | Castella | 55/316 |

FOREIGN PATENT DOCUMENTS

| 2318309 | 11/1974 | Fed. Rep. of Germany | 415/121 G |
|---|---|---|---|
| 3560 | 9/1967 | Japan | 55/400 |
| 532467 | 1/1941 | United Kingdom | 55/400 |
| 1037365 | 7/1966 | United Kingdom | 55/400 |

Primary Examiner—Bernard Nozick
Attorney, Agent, or Firm—Finnegan, Henderson, Farabow, Garrett & Dunner

[57] ABSTRACT

A fluid propelling and filtering apparatus with removable filter cartridge comprising a bottom wall, an annular top wall, and filter media disposed between and secured to the walls for securing the bottom wall to the top wall in parallel, spaced relation and for communicating fluid in through the annular top wall and out through the outer surface of the filter material. The filter cartridge is removably attached to an electric motor for imparting rotational movement to the filter cartridge. The filter cartridge and the motor are enclosed within a housing.

16 Claims, 12 Drawing Figures

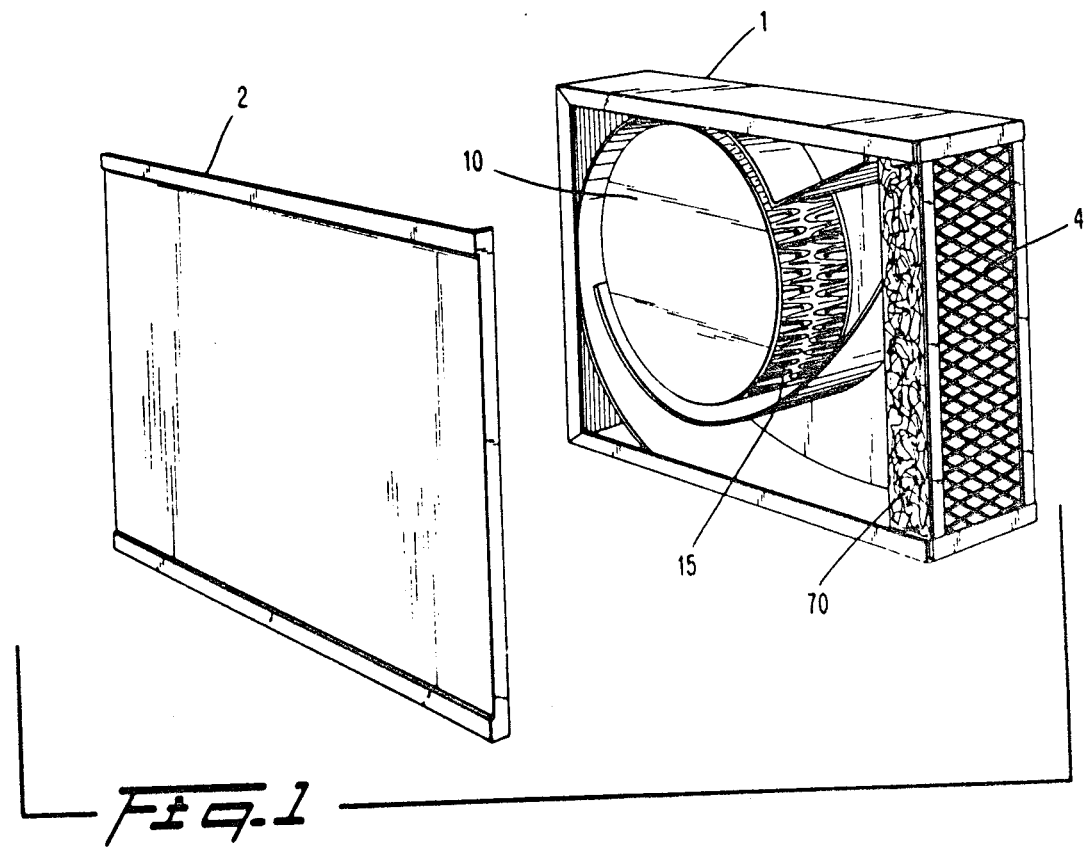
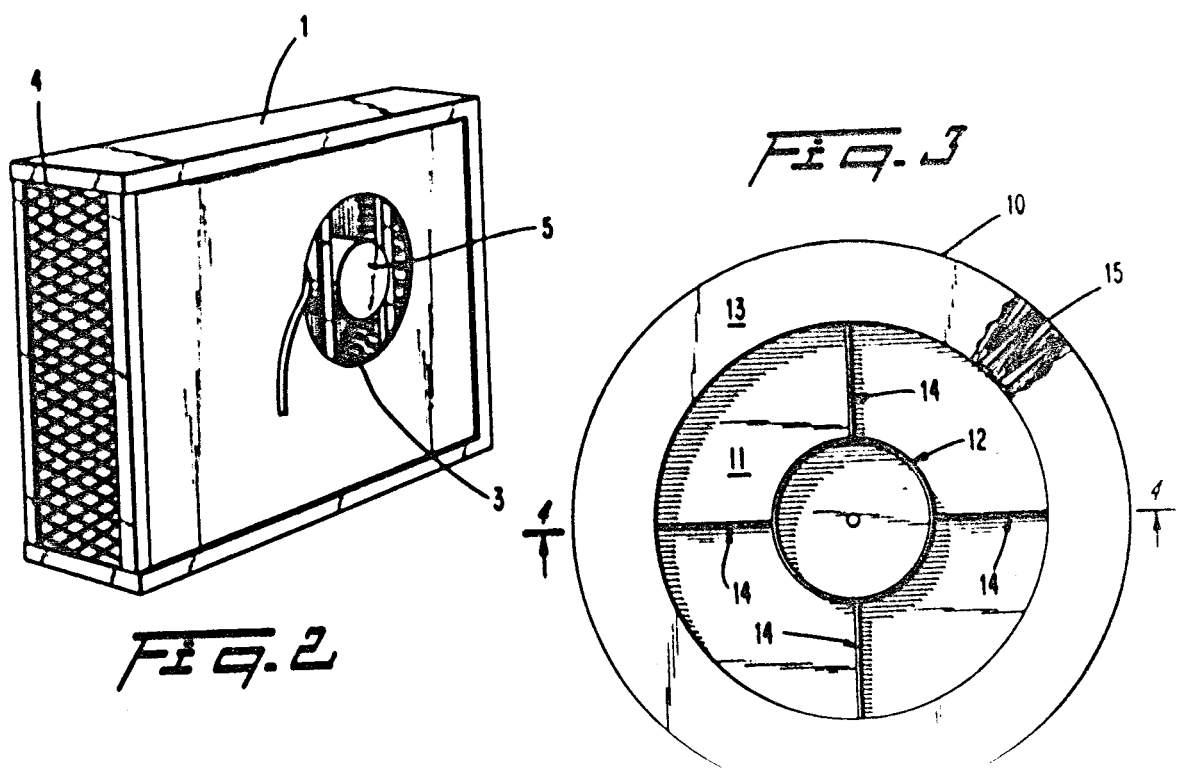

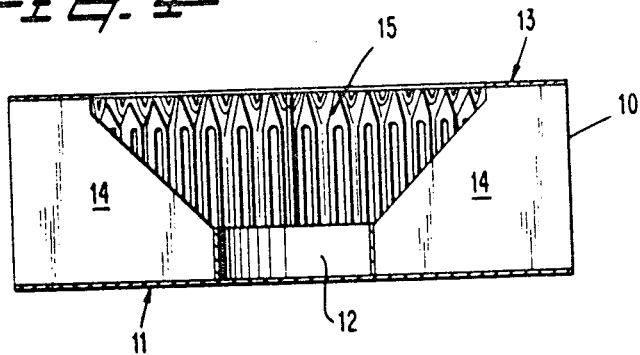
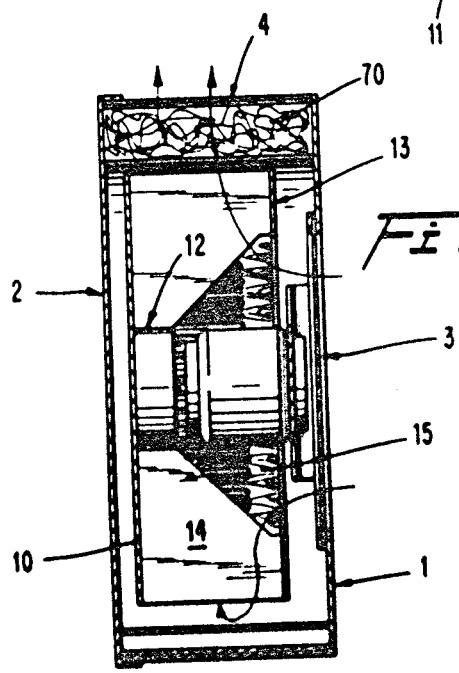
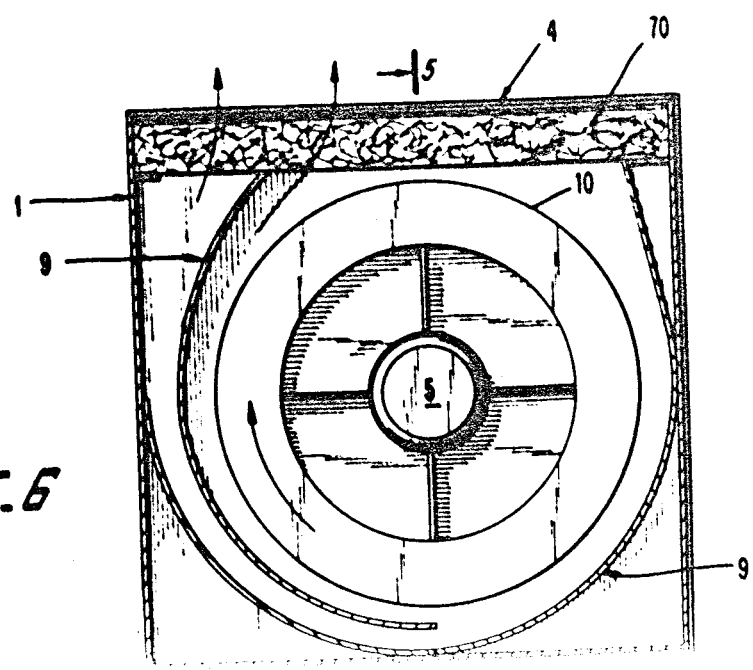

FLUID PROPELLING AND FILTERING APPARATUS WITH REMOVABLE FILTER CARTRIDGE

BACKGROUND OF THE INVENTION

1. Field of the Invention

This invention relates generally to the field of fluid filtering apparatus and more specifically to a fluid filtering apparatus which simultaneously imparts motion to a fluid, e.g. air, and extracts from the fluid foreign particulate matter carried by the fluid.

2. Description of the Prior Art

Apparatus for simultaneously propelling and filtering a fluid is well known in the art. One such apparatus is disclosed in U.S. Pat. No. 3,018,896, issued to L. V. Gewiss on Jan. 30, 1962. In the past such apparatus have required the filter media utilized to be retained within a metal drum having an outer perforated peripheral wall to support and retain the rotating filter material. The filter media in the form of a strip of folded pleats is placed inside the drum and rests against the inside of the perforated outer wall. During operation of the apparatus, the filter media is held in place against the perforated wall by means of centrifugal force.

Although such devices have served the purpose of propelling and filtering fluid, they have not proved entirely satisfactory due to operational and economical disadvantages. Due to the use of the metal drum and outer perforated peripheral filter media retaining wall, the expense of manufacturing the apparatus is relatively great. Furthermore, dynamic balancing of the metal drum is required for proper operation. In practice, the outer perforated peripheral wall has caused fluid resistance and generated noise during operation. Additionally, the weight of the walled metal drum has led to drive motor bearing problems and related expenses of repair and replacement. During operation of the prior art apparatus, the loosely supported filter media tends to flatten against the outer perforated peripheral wall, prematurely ending the usefulness of the filter media. Further difficulties are encountered when the filter material utilized becomes clogged up, requiring a change of the filter media. Replacement of the filter media by hand is quite an unclean and inconvenient operation. Furthermore, the manual replacement of the pleated filter media often allows for erratic spacing of the pleats, resulting in reduced filter efficiency.

From the foregoing considerations, it should be apparent that there is a great need for an improved fluid propelling and filtering apparatus.

It is, thus, an object of the invention to provide fluid propelling and filtering apparatus with a removable and disposable filter cartridge.

Another object of the invention is to eliminate the manufacturing expense and weight of a metal drum and outer peripheral wall in fluid propelling and filtering apparatus.

A further object of the invention is to eliminate the need for dynamic balancing of a metal drum in fluid propelling and filtering apparatus.

Still another object of the invention is to reduce the fluid resistance and noise generation in fluid propelling and filtering apparatus.

Yet another object of the present invention is to allow clean, easy, quick, and convenient replacement of the filter media in fluid propelling and filtering apparatus.

A still further object of the present invention is to improve fluid propelling and filtering apparatus by using a removable filter cartridge having factory-spaced pleats to allow more efficient filtration.

Another object of the invention is to extend the filter media life of fluid propelling and filtering apparatus.

A further object of the invention is to reduce operation hazards of fluid propelling and filtering apparatus by using a removable, expendable filter cartridge constructed of relatively soft materials and having lower mass.

Other objects and features of the present invention will further become apparent hereinafter with reference to the accompanying drawings and detailed description of the invention.

SUMMARY OF THE INVENTION

To achieve the foregoing objects and in accordance with the purpose of the invention, as embodied and broadly described herein, the apparatus for simultaneously imparting motion to a fluid and extracting foreign particles carried by the fluid comprises a housing having at least one intake port and at least one exhaust port; a removable cylindrical filter cartridge disposed within the housing; means, such as an electrical motor having its drive shaft supporting a hub, for driving the filter cartridge into rotation around its geometrical axis whereby the rotation imparts motion to the fluid. The filter cartridge includes a bottom wall having means for removably securing the cartridge to the driving means, such securing means being, for example, a collar to fit snugly over the motor drive shaft hub or screws or bolts; an annular top wall; and filter media disposed between and secured to the walls for securing the bottom wall to the top wall in parallel, spaced relation where the outer periphery of the walls define the circumference of a cylinder, and for communicating the fluid in through the annular top wall and out through the outer surface of the filter media. Additionally, the filter cartridge can have partition means, preferably a plurality of partitions extending radially from the collar for maintaining the walls in parallel, spaced relation and for communicating the fluid in through the annular top wall and out through the outer surface of the filter media. The walls, collar, and partition of the removable cylindrical filter cartridge preferably are made of readily disposable, expendable, and relatively inexpensive material such as cardboard, fiberboard, or the like.

The general purpose of the invention is to improve a fluid propelling and filtering apparatus so as to embrace all the advantages of the prior art devices and to possess none of the afore-described disadvantages. To attain this, the invention contemplates a unique, removable filter cartridge.

BRIEF DESCRIPTION OF THE DRAWINGS

The accompanying drawings, which are incorporated in and constitute a part of this specficiation, illustrate several embodiments of the invention and, together with the description, serve to explain the principles of the invention.

Of the drawings:

FIG. 1 is a perspective view of the fluid propelling and filtering apparatus of the invention with the access door on one side removed to show the removable filter cartridge.

FIG. 2 is a side view of the fluid propelling and filtering apparatus from the side opposite that of FIG. 1.

FIG. 3 is a top view of one embodiment of the removable filter cartridge shown in FIG. 1.

FIG. 4 is a sectional view of the removable filter cartridge taken on the line 4—4 of FIG. 3.

FIG. 5 is a sectional view of the fluid propelling and filtering apparatus shown in FIG. 1 taken on the line 5—5 of FIG. 6.

FIG. 6 is a side view of the fluid propelling and filtering apparatus shown in FIG. 2 with the housing side structure removed to show the interior of the housing.

DESCRIPTION OF THE PREFERRED EMBODIMENT

Figure 7:
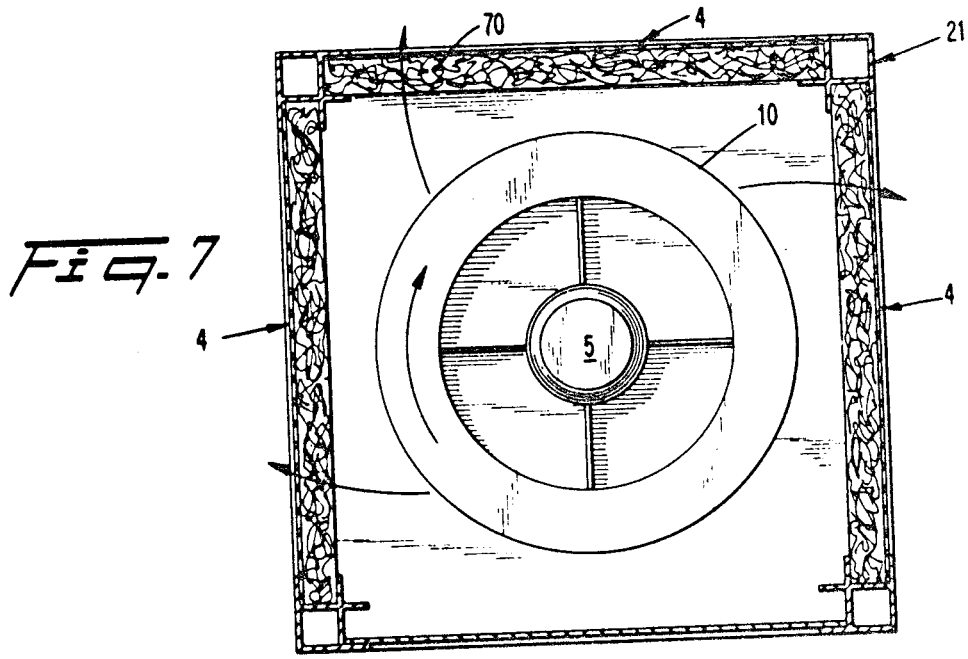
FIG. 7 is a side view of a modification of the fluid propelling and filtering apparatus shown in FIG. 6 again with the housing side structure removed.

Reference will now be made in detail to the present preferred embodiments of the invention, examples of which are illustrated in the accompanying drawings.

Referring now to the drawings, wherein like reference characters designate like or corresponding parts throughout the several views, there is shown in FIG. 1 and FIG. 2, which illustrates a preferred embodiment, housing 1 having intake port 3 and exhaust port 4. Access door 2 is shown in FIG. 1 detached from the rest of the housing to expose the removable cylindrical filter cartridge 10. If desired, housing 1 may also contain an optional vapor absorbant filter 70 at exhaust port 4. The apparatus of the invention includes means for driving the filter cartridge into rotation around its geometrical axis, the rotation imparting motion to the fluid. As embodied herein the driving means includes an electrical motor 5 or any other means suitable for imparting motion to the filter cartridge. In operation, when driving means 5 is activated, filter cartridge 10 rotates causing fluid to be drawn into intake port 3, through filter media 15 of filter cartridge 10, and out through exhaust port 4.

As shown in FIG. 3 and FIG. 4, filter cartridge 10 has a bottom wall 11 with means 12 for removably securing cartridge 10 to driving means 5. Cartridge securing means 12 may comprise a collar, as embodied herein, to fit snugly on hub 7 of driving means 5 as shown in FIG. 5, or other means such as screws or bolts, or both frinctional and mechanical means. Filter cartridge 10 has an annular top wall 13 and filter media 15 for securing bottom wall 11 to top wall 13 in parallel, spaced relation. The outer periphery of walls 11 and 13 define the circumference of a cylinder.

If desired, filter cartridge 10 can have partition means for maintaining the walls 11 and 13 in parallel, spaced relation and for communicating the fluid in through the annular top wall and out through the outer surface of the filter media. As illustrated in FIGS. 3 and 4, the partition means comprises a plurality of partitions extending radially from cartridge securing means 12. Preferably there are four partitions 14 each disposed at a 90 degree interval from adjacent partitions. In order to reduce the overall weight of the filter cartridge 10 and to provide means for permitting fluid flow through one or more partitions thus reducing interference with fluid flow, one or more of the partitions can be supplied with an aperture therein.

Filter media 15 is made from a sheet of filtering material, such as paper, fabric or the like, well known in the art, and formed to a suitable breadth and length to be disposed between walls 11 and 13 and, if present, between each of a pair of partitions 14. Filter media 15 may be secured to walls 11 and 13 by any suitable means, such as glue, tape or the like. Additionally, filter media 15 can be secured to partitions 14 in a similar manner.

In the filter cartridge illustrated, since partitions 14 act like blades of a fan for propelling the fluid through the apparatus, there is no need in this embodiment of the invention to fold the filtering material into pleats as is required in the prior art devices, folded pleats being adapted in the prior art devices to act like the blades of a fan to propel the fluid. Filter media 15 need only be secured within filter cartridge 10 sufficiently to withstand deformation from the application of centrifugal force during operation. In the preferred embodiment, filter media 15 is, in fact, configured in folded pleats to provide adequate stability to the filter media 15. The spacing of the folded pleats of filter media 15 in filter cartridge 10 results in uniform and efficient filtering and promotes longer filter use between changes.

The elements of filter cartridge 10, excluding filter media 15, are made of lightweight, semi-rigid, and relatively inexpensive material such as cardboard, particle board, plastic or the like.

Filter cartridge 10 is suitable for use in numerous housing configurations, such as those shown in FIGS. 5 through 12 herein. FIG. 5 illustrates one embodiment of the fluid propelling and filtering apparatus utilizing filter cartridge 10. As shown in FIG. 5 and FIG. 6, which is a diagrammatic view of the device shown in FIG. 1 and FIG. 2, filter cartridge 10 is placed securely on hub 7 of motor 5 housed within housing 1 and access door 2 is placed in its closed position. Housing 1 contains a baffle 9 positioned to allow fluid flow into intake port 3, through the opening of annular top wall 13, through filter media 15 of cartridge 10, and out through exhaust port 4 (and optional vapor absorbant filter 70 if present) when motor 5 is activated to impart rotation to filter cartridge 10 as shown by the arrow in FIG. 6.

FIG. 7 illustrates a second embodiment of the invention wherein housing 21 is similar to housing 1 except that housing 21 has a plurality of exhaust ports 4 and internal baffles are not necessary. Housing 21 may have exhaust port 4 on two or more of its sides or be cylindrical in shape with the curved side of the cylinder being one continuous exhaust port 4 or sectioned into more than one exhaust port 4.

In the embodiments illustrated in FIG. 5 and FIG. 7, fluid flow into housing 1 or housing 21 is generally parallel to the geometrical axis of filter cartridge 10 and fluid flow out of housing 1 or housing 21 through exhaust port 4 is in a path generally perpendicular to the geometrical axis of filter cartridge 10.

Figure 8:
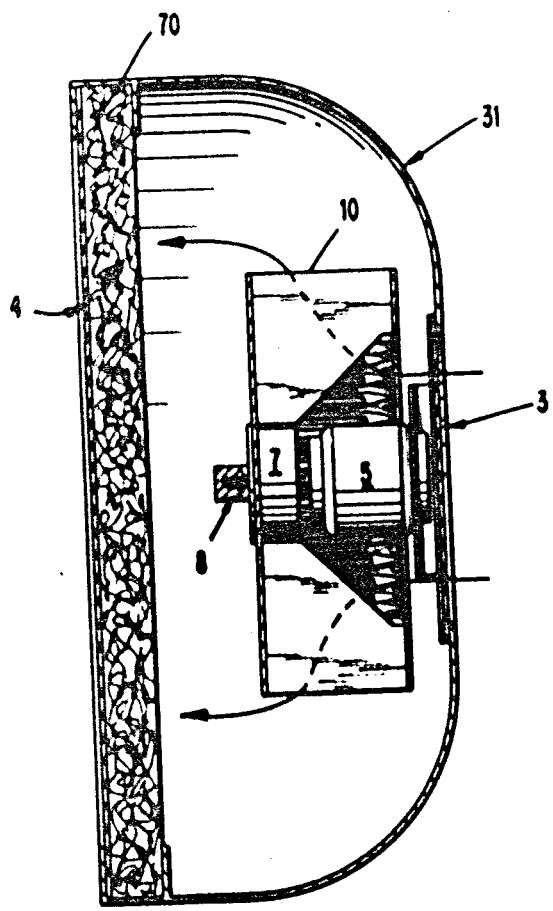
FIG. 8 is a sectional view of a third embodiment of the fluid propelling and filtering apparatus.

FIG. 8 illustrates a third embodiment of the fluid propelling and filtering apparatus in which housing 31 is generally in a cylindrical configuration. FIG. 8 also shows driving means connector 8 to provide mechanical fastening of filter cartridge 10 to driving means 5.

such connector 8 being, for example, a threaded cap to screw on to a threaded drive shaft, or screws, or bolts, or the like. Access to filter cartridge 10 may be had through exhaust port 4 or other suitable means.

Figure 9:
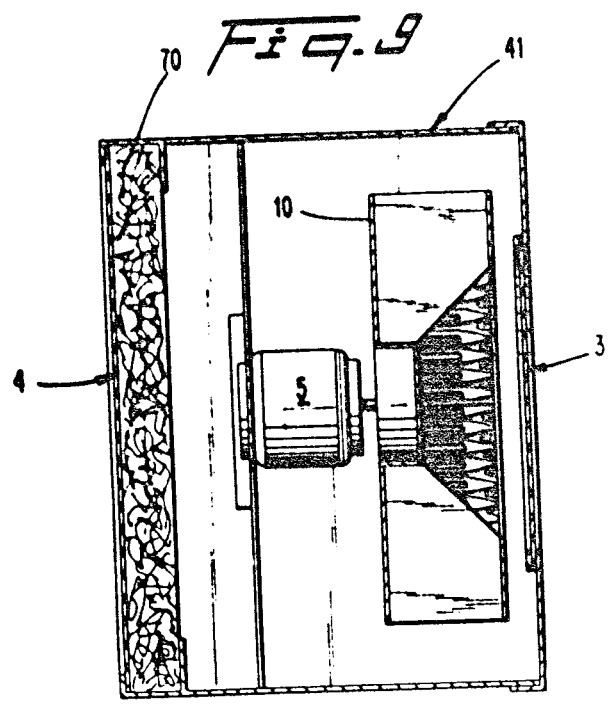
FIG. 9 is a sectional view of a fourth embodiment of the fluid propelling and filtering apparatus.

FIG. 9 illustrates a fourth embodiment of the invention similar to that in FIG. 8 except that motor 5 is on the exhaust side of filter cartridge 10. Within housing 41 in both the third and fourth embodiments, during operation of the apparatus, fluid flows into housing 31 or housing 41 generally parallel to the geometrical axis of filter cartridge 10 and flows out of housing 31 or housing 41 through exhaust port 4 in a path generally parallel to the geometrical axis of filter cartridge 10.

Figure 10:
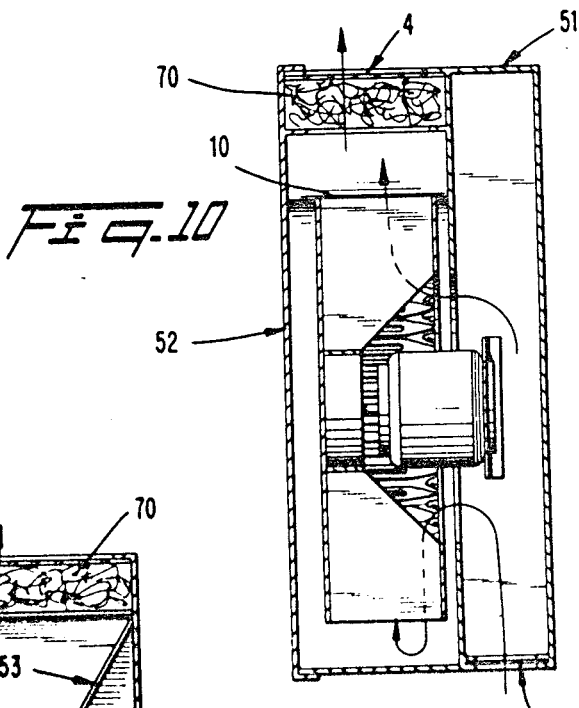
FIG. 10 is a sectional view of a fifth embodiment of the fluid propelling and filtering apparatus being taken on the line 10—10 of FIG. 11.
Figure 11:
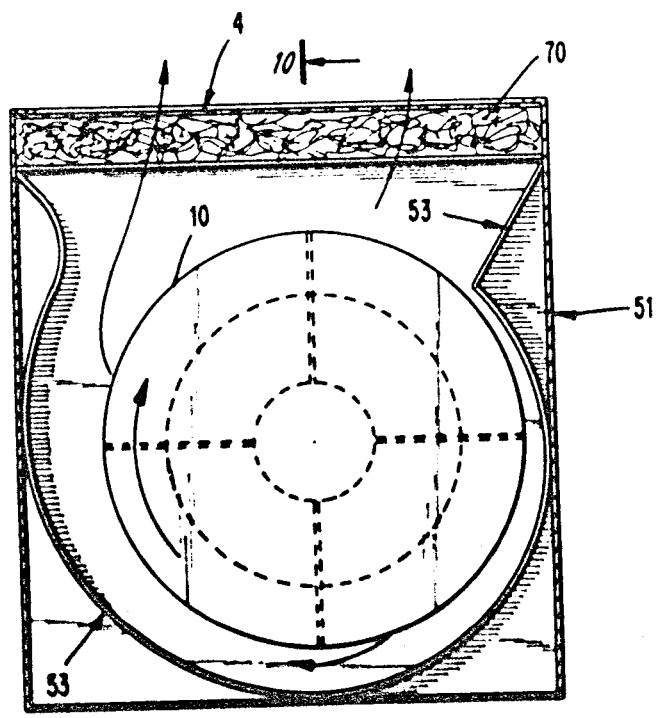
FIG. 11 is a side view of the fifth embodiment of the fluid propelling and filtering apparatus with the access door removed.

The fifth embodiment of the present invention is illustrated in FIG. 10 and FIG. 11 wherein filter cartridge 10 is disposed within housing 51 having removable cartridge access door 52 and internal baffle 53. In this configuration, fluid flows into and out of housing 51 in a path generally perpendicular to the geometrical axis of filter cartridge 10.

Figure 12:
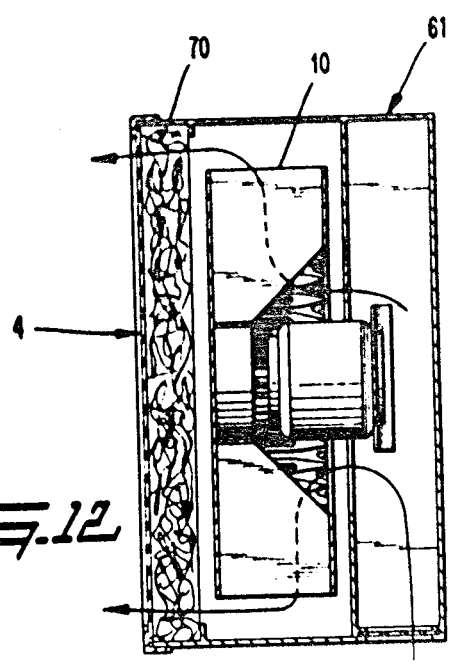
FIG. 12 is a sectional view of a sixth embodiment of the fluid propelling and filtering appartus.

FIG. 12 illustrates a sixth embodiment of the invention wherein filter cartridge 10 is enclosed within housing 61 which is configured to provide for fluid flow into housing 61 in a path basically perpendicular to the geometrical axis of filter cartridge 10 and out of housing 61 in a path generally parallel to said geometrical axis. Access to filter cartridge 10 is through exhaust port 4 or other suitable means.

In describing the operation of the present invention, reference will only be made to the first embodiment shown in FIGS. 1, 2, 5, and 6; however, by describing operation of the one embodiment, one skilled in the art will understand the operation of the other embodiments of the fluid propelling and filtering apparatus.

In operation, cartridge access door 2 is opened to gain access to filter cartridge 10 and the interior of housing 1. Used filter cartridge 10, if present within housing 1, is removed and discarded in a convenient, clean, and quick operation and a new filter cartridge 10 placed securely on hub 7 of motor 5, and cartridge access door 2 is then placed in its closed position on housing 1. As discussed above, motor 5 is activated to cause rotation of filter cartridge 10 which, by aid of the motion of pleated filter media 15 and, if present, by aid of the motion of partitions 14 acting like fan blades, imparts motion to the fluid surrounding the filter cartridge. This, in turn, results in fluid flow being drawn into housing 1 through intake port 3, through filter media 15 and out of housing 2 through exhaust port 4 (and optional vapor absorbant filter 70 if present) while providing for the filtering of fluid passing through filter cartridge 10.

Once filter media 15 of filter cartridge 10 becomes clogged up or whenever otherwise desired, filter cartridge 10 may be removed from housing 1 through access door 2, discarded and replaced with yet another filter cartridge 10 in a quick, clean, and inexpensive operation.

The fluid propelling and filtering apparatus of the invention may be used free standing in a room, suspended from an overhead, placed in a window or wall partition, placed within ventilation ducts or other fluid conduits, connected to ventilation ducts or other fluid conduits or the like.

Obviously many modifications and variations of the present invention are possible in light of the above teachings. It is, therefore, to be understood, that within the scope of the appended claims, the invention may be practiced otherwise than as specifically described.

What is claimed:

1. An apparatus for simultaneously imparting motion to a fluid and extracting foreign particles carried by said fluid, comprising:

a housing have at least one intake port and at least one exhaust port;

a removable cylindrical filter cartridge disposed within said housing; and means for driving said filter cartridge into rotation around its geometrical axis;

said filter cartridge including a disc-shaped bottom wall having means for removably securing said cartridge to said driving means; an annular top wall; and pleated, annularly-configured filter media means disposed between and attached to said walls (1) for securing said bottom wall to said top wall in parallel, spaced relation, the outer periphery of said walls defining the circumference of a cylinder, (2) for imparting motion to said fluid upon rotation of said filter media means to draw said fluid in through said annular top wall and out through the outer surface of said filter media means, said rotation being imparted to said filter media means by the rotation of said filter cartridge, and (3) for extracting foreign particles carried by said fluid as said fluid flows through said filter media means, said filter media means being retained in said filter cartridge only by being attached to said walls thereby eliminating any retention means about the outer surface of said filter media means.

2. An apparatus according to claim 1 wherein the outer surface of said filter media means is flush with the outer periphery of said walls, said outer surface of said filter media means forming the entire outer curved wall of said cylinder.

3. An apparatus according to claim 1 wherein said means for securing said cartridge to said driving means includes a collar having its geometrical axis coincidental with the geometrical axis of said cartridge.

4. An apparatus according to claim 1 wherein said intake port of said housing is positioned for permitting flow of said fluid into said housing parallel to the geometrical axis of said cartridge.

5. An apparatus according to claim 4 wherein said exhaust port of said housing is positioned for permitting flow of said fluid out of said housing through said exhaust port in a path perpendicular to the geometrical axis of said cartridge.

6. An apparatus according to claim 4 wherein said exhaust port of said housing is positioned for permitting flow of said fluid out of said housing through said exhaust port in a path parallel to the geometrical axis of said cartridge.

7. An apparatus according to claim 1 wherein said intake port of said housing is positioned for permitting flow of said fluid into said housing perpendicular to the geometrical axis of said cartridge.

8. An apparatus according to claim 7 wherein said exhaust port of said housing is positioned for permitting flow of said fluid out of said housing through said exhaust port in a path perpendicular to the geometrical axis of said cartridge.

9. An apparatus according to claim 7 wherein said exhaust port of said housing is positioned for permitting flow of said fluid out of said housing through said exhaust port in a path parallel to the geometrical axis of said cartridge.

10. A filter cartridge for simultaneously imparting motion to a fluid and extracting foreign particles carried by said fluid under the impetus of a means for driving said cartridge in rotation around its geometrical axis comprising:
- a disc-shaped bottom wall having means for removably securing said cartridge to said driving means;
- an annular top wall; and
- pleated, annularly-configured filter media means disposed between and attached to said walls (1) for securing said bottom wall to said top wall in parallel, spaced relation, the outer periphery of said walls defining the circumference of a cylinder, (2) for imparting motion to said fluid upon rotation of said filter media means to draw said fluid in through said annular top wall and out through the outer surface of said filter media means, said rotation being imparted to said filter media means by the rotation of said filter cartridge, and (3) for extracting foreign particles carried by said fluid as said fluid flows through said filter media means, said filter media means being retained in said filter cartridge only by being attached to said walls thereby eliminating any retention means about the outer surface of said filter media means.

11. A cartridge according to claim 10 wherein the outer surface of said filter media means is flush with the outer periphery of said walls, said outer surface of said filter media means forming the entire outer wall of said cylinder.

12. A cartridge according to claim 10 wherein said means for securing said cartridge to said driving means includes a collar having its geometrical axis coincidental with the geometrical axis of said cartridge.

13. A filter cartridge for simultaneously imparting motion to a fluid and extracting foreign particles carried by said fluid under the impetus of a means for driving said cartridge in rotation about its geometrical axis comprising:
- a disc-shaped bottom wall having means for removably securing said cartridge to said driving means;
- an annular top wall;
- a plurality of partition means disposed between and attached to said walls for securing said bottom wall to said top wall in parallel, spaced relation, said plurality of partition means extending radially from said means for securing said cartridge to said driving means; and
- filter media means disposed between and attached to said walls and to each of a pair of said partition means in an annular configuration for extracting foreign particles carried by said fluid as said fluid flows through said filter media means,
- said partition means imparting motion to said fluid upon rotation of said filter cartridge and drawing said fluid in through said annular top wall and out through the outer surface of said filter media means, said filter media means being retained in said cartridge only by being attached to said walls and said partition means thereby eliminating any retention means about the outer surface of said filter media means.

14. A cartridge according to claim 13 wherein said partition means comprise four partitions, each disposed at a 90 degree interval from adjacent partitions.

15. A cartridge according to claim 13 wherein said means for securing said cartridge to said driving means is secured to said partition means.

16. A cartridge according to claim 14 wherein at least one of said partitions contains means for permitting fluid flow therethrough.

* * * * *